Figure 1:
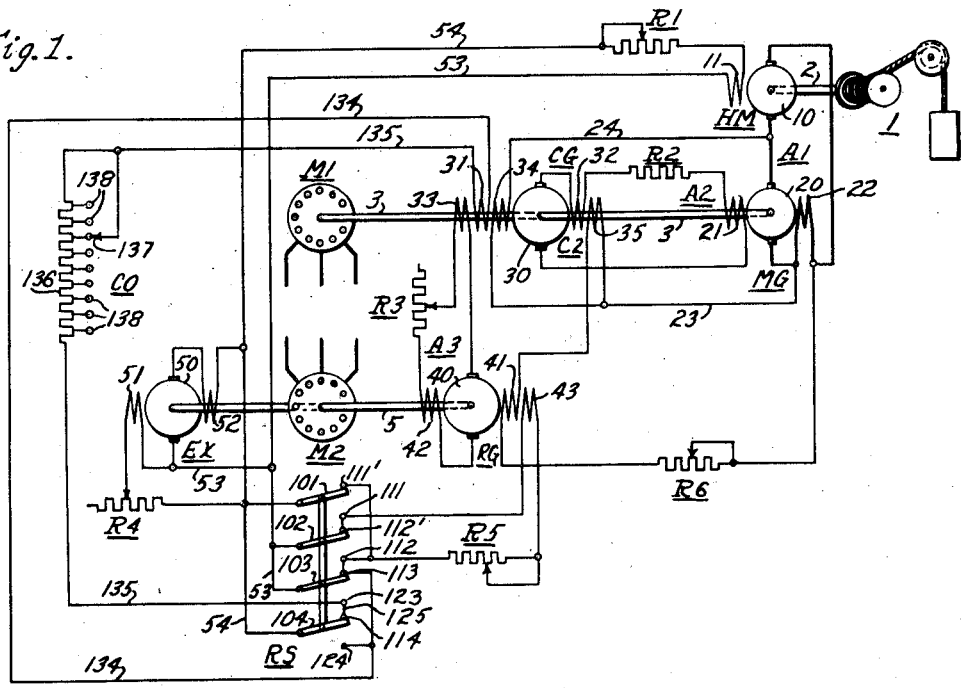

Sept. 4, 1945.  J. G. IVY  2,383,971

VARIABLE VOLTAGE CONTROL

Filed July 29, 1943   3 Sheets-Sheet 1

WITNESSES:

INVENTOR
Joe G. Ivy.
BY
Paul E. Friedemann
ATTORNEY

Sept. 4, 1945. J. G. IVY 2,383,971
VARIABLE VOLTAGE CONTROL
Filed July 29, 1943 3 Sheets-Sheet 2

WITNESSES:
Alice L. Howell

INVENTOR
Joe G. Ivy.
BY Paul E. Friedemann
ATTORNEY

Sept. 4, 1945.   J. G. IVY   2,383,971
VARIABLE VOLTAGE CONTROL
Filed July 29, 1943   3 Sheets-Sheet 3
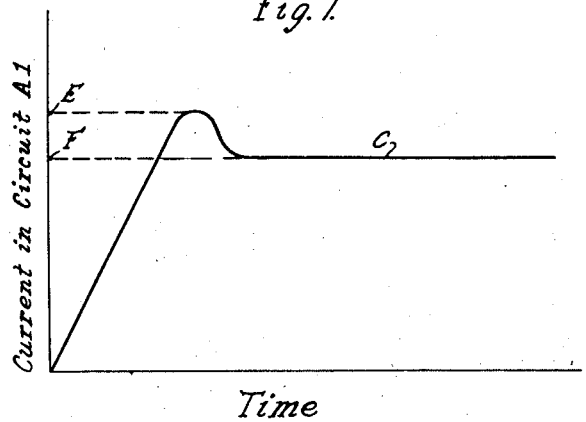
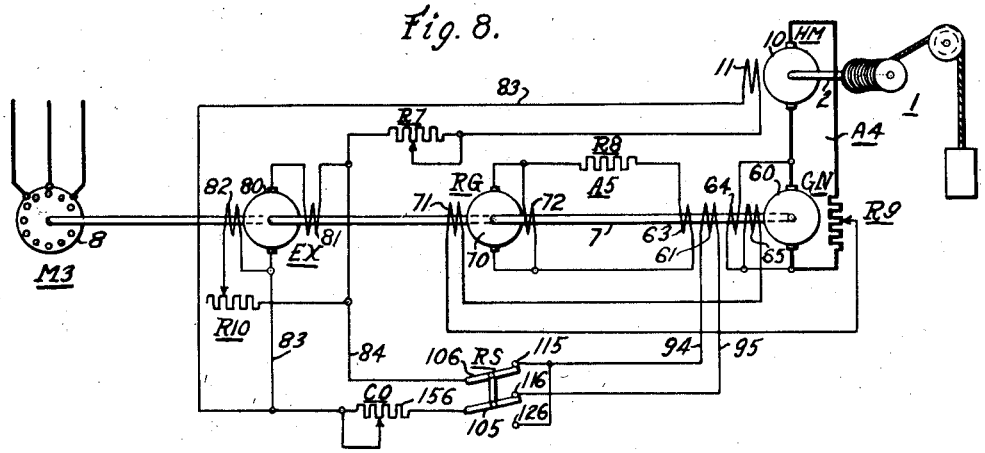
WITNESSES:
INVENTOR
Joe G. Ivy.
BY
ATTORNEY Patented Sept. 4, 1945

2,383,971

UNITED STATES PATENT OFFICE 2,383,971

VARIABLE VOLTAGE CONTROL

Joe G. Ivy, Pittsburgh, Pa., assignor to Westinghouse Electric Corporation, East Pittsburgh, Pa., a corporation of Pennsylvania Application July 29, 1943, Serial No. 496,596

24 Claims. (Cl. 172—239)

My invention relates to electric machines, particularly in connection with drives of the Ward Leonard or variable voltage type.

The control system of such a drive includes a generator whose armature output circuit feeds energizing current of variable voltage to the drive motor to be controlled, while the generator field is supplied with regulatable excitation from a controlled current source which may consist of another generator so as to form a cascade arrangement of dependently operating generators.

In control systems of the general type just described, it is often desirable to impose certain limitations on the output current or voltage applied to the machine to be ultimately controlled or supplied by one of the generators to one or more of the following generators of the cascade arrangement. This will best be understood from an example:

In mine hoist drives, it is desirable to limit the peak currents acting on the hoist motor in order to prevent damage to the motor and the hoisting equipment driven thereby. The torque of the hoist motor and, consequently, the stress on the ropes and other mechanical parts are a function of the motor current. Therefore, limiting the current to a maximum value will, in turn, keep the mechanical stress at a safe value. The hoist motor and its associated generator are designed to commutate certain maximum currents. Sparking at the brushes will be excessive when the currents are exceeded, and more than normal maintenance will then be required to keep the commutator functioning properly. Hence, a limitation of the maximum current will reduce the maintenance on the main equipment and afford the application of equipment with smaller margins of overload rating.

The cause of most excessive current in mine hoist drives is a too rapid advancement of the master controller. That is, if the operator attempts to bring the hoist up to speed too rapidly, the torque required to produce this acceleration is accompanied by excessive current in the motor.

In order to prevent such overloads, current-limiting circuit breakers or interrupters may be employed. However, the action of such breakers is apt to interfere with an efficient operation and may lead to other drawbacks incident to the interruption of the operating current.

These conditions, while elucidated by the example of mine hoists, obtain also in other kinds of cascade-connected generator systems for variable voltage control.

It is an object of my invention to provide control systems of the type here in point which afford an automatic current limitation without the use of circuit breakers or the like interrupting devices in the control system proper.

According to another object, the invention aims at providing a cascade-connected generator arrangement for variable voltage control in which a current-limiting effect is produced by one of these generators.

It is also an object to provide an electric machine, such as a generator, whose characteristic of operation affords a limiting effect so as to be applicable in systems and for the purpose just mentioned.

Another object of my invention is to provide a reversible current-limiting drive control in accordance with the foregoing aims that permits an asymmetric operation, i. e., a shifting of the limit conditions in dependence upon the direction of a control function, in particular when applying the control system to hoist drives.

In order to achieve the above-mentioned objects and advantages, the invention, in one of its aspects, consists in a variable voltage control system designed and functioning in the following manner: A main generator with an armature circuit for supplying the variable voltage to be controlled has its field circuit connected to the armature output circuit of a regulating generator, either directly or over an intermediate cascade-connected generator, whose field circuit is energized in dependence upon the current to be controlled and inductively associated with saturable magnetic means for biasing the energization of the main generator field due to saturation of the magnetic means when the current exceeds a given limit value so as to produce the desired current or voltage limiting effect.

In another aspect, allied to the foregoing and more specific, the invention provides for the direct or indirect control of the main generator a regulating generator whose field poles include magnetic shunt means which become saturated when the appertaining field current, in dependence upon the current to be controlled, exceeds a given value.

According to another feature of the invention relating especially to hoist drives, the just-mentioned regulating generator for the current-limiting control of the main generator of a variable drive is provided with an additional bias field winding whose energization is varied in accordance with the position of a switch serving to reverse the operating direction of the drive. This bias field provides asymmetric operation such as to give a different limit for driving power at regenerative power.

In a further aspect the invention requires for controlling an output or feed voltage a generator with a plurality of field windings, one of which is energized from a separate current source through a regulating device so as to determine the basic value of the output or feed voltage, while another of these field windings is excited by the armature circuit of a current-regulating generator whose field circuit includes saturable magnetic means and is excited in dependence upon the output or feed voltage in the manner already mentioned.

Figure 2:
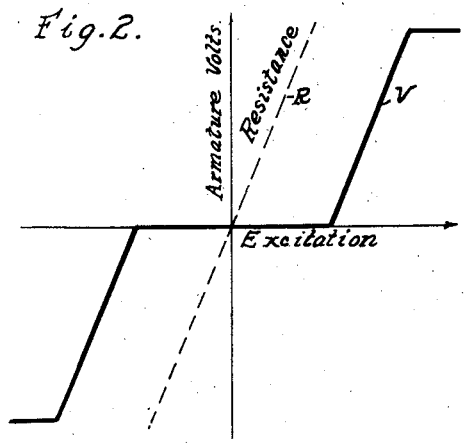
Figure 3:
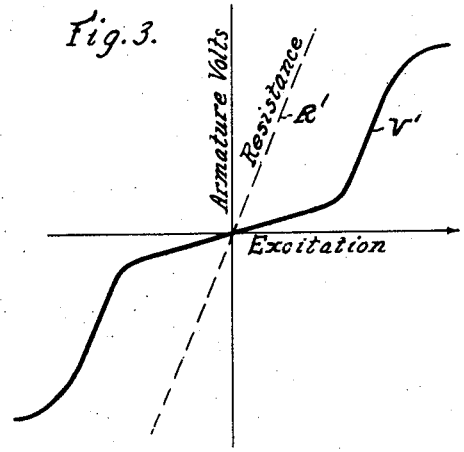
Figure 4:
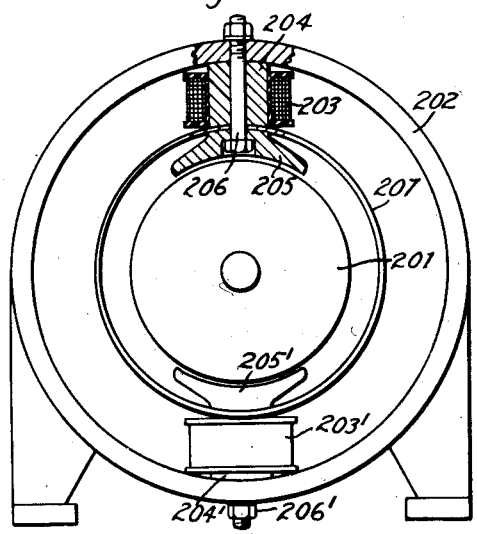
Figure 5:
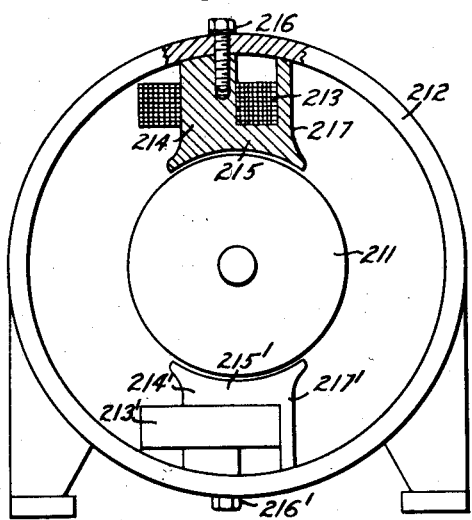
Figure 6:
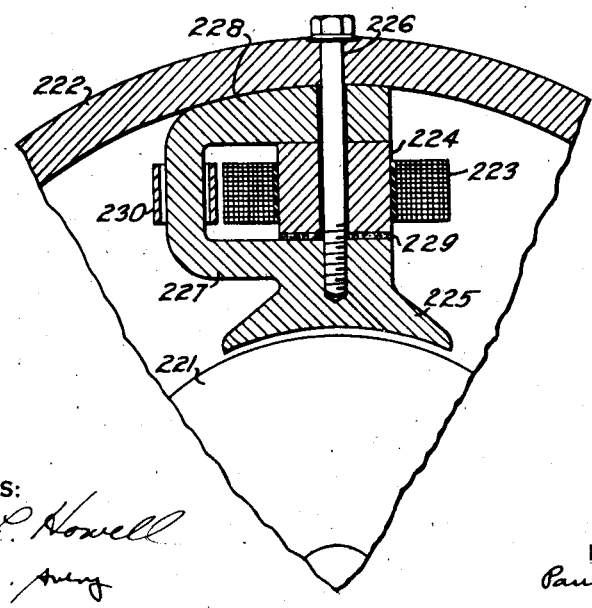

Other objects, advantages, and features of the invention will be apparent from the description, presented hereinafter, of the embodiments illustrated in the drawings, in which:

Figure 1 exemplifies the invention by showing a circuit diagram of a control system for a mine hoist drive, and Figs. 2 and 3 are explanatory diagrams relating to the saturation characteristic of a current-regulating generator which forms part of the control system of Fig. 1, while Figs. 4, 5 and 6 represent cross-sectional views of three different machines, respectively, designed to afford the required saturation characteristic and to be used as a current-regulating generator in the control system of Fig. 1;

Fig. 7 is explanatory and shows a current time diagram relating to the embodiment of Fig. 6; and Fig. 8 is a circuit diagram of another hoist drive control system also in accordance with the invention and with the explanatory diagrams of Figs. 2 and 3 and provided with a current-regulating generator of the type represented by Figs. 4, 5 or 6.

Referring to the hoist control system shown in Fig. 1, the hoisting equipment proper is schematically indicated at 1 and includes a hoisting drum whose shaft 2 is mechanically connected to the armature 10 of a driving motor HM. The field winding 11 of motor HM is energized from a separate current source of substantially constant voltage, and to this end is connected through leads 53 and 54 with an exciter generator denoted by EX. The connection includes an adjusting rheostat R1. Once properly adjusted, the rheostat R1 need not be varied during the operation of the control system.

The armature 10 of the hoist motor HM is connected to a feed circuit A1 in series arrangement to the armature 20 of a main generator MG which forms the current source of the feed circuit A1. The main generator MG has a main field winding 21 connected to a control circuit A2 whose current source is formed by the armature 30 of a control generator CG. A resistor R2 is series-arranged in circuit A2. Numeral 22 denotes a compensating or interpole winding of the main generator MG.

The control generator CG has five field windings, numbered 31 through 35, in order to control the voltage impressed on the main generator field winding 21. Consequently, the resultant energization of field winding 21 depends on the reaction of the five field windings of the control generator CG and determines the voltage and current supplied by the main generator armature 20 through the feed circuit A1 to the hoist motor HM, thereby controlling the torque or speed of the hoisting equipment driven by the motor HM.

The armature output current in circuit A2 is principally determined by the field winding 31 which, therefore, is designated in the following as the principal field winding of the control generator CG. The self-energizing field winding 32 serves to amplify the control effect and is connected with circuit A2. While this connection is shown as a series arrangement, a self-energizing shunt winding may be used instead. Considering the field of winding 31 as a reference and assuming that the generator MG supplies energy to the hoist motor rather than functioning in a regenerative sense, windings 32 and 35 act cumulatively; that is their ampere turns are in a proper direction to assist the ampere turns of field winding 31. In contrast thereto, the two field windings 33 and 34 act differentially with regard to winding 31. It should be noted that for certain values of current in circuit A1, as explained later, field winding 33 will be substantially deenergized. However, as long as it is energized due to the action of generator RG, the effect of its ampere turns will subtract from that of the ampere turns of winding 35. In other words, the current effective in the differential field windings 33 and 34 tends to diminish the resultant field strength effective on the armature 30 of the control generator CG.

The differential winding 34 of the control generator CG is energized in dependence upon the voltage in the feed circuit A1, and to this end connected by leads 23 and 24 across the armature 20 of the main generator MG. The voltage thus imposed on the differential field winding 34 is closely proportional to the speed of the hoist motor HM since the excitation of the motor field winding 11 is kept constant. If the principal field winding 31 has a large number of ampere turns and if the voltage responsive field winding 34 has an almost equal number of ampere turns, the response of the control generator CG to changes in speed of the hoist motor HM is highly sensitive.

The principal field winding 31, serving to determine the basic speed of the hoist motor as to direction and magnitude, is energized from a current source of constant voltage over suitable voltage regulating and reversing means. According to the illustrated embodiment, the winding 31 is connected through leads 135 and 134 with the leads 53 and 54 of the exciter EX, a reversing switch RS being interposed in order to select the polarity of the voltage impressed on the principal field winding 31. The connection includes a control device CO which has a resistor 136 series-connected between lead 135 and reversing switch RS. A movable contact 137 cooperating with a bank of contacts 138 serves to adjust the effective resistance of the control device CO, the contacts 138 being connected to corresponding taps of the resistor 136. Further details of the reversing switch RS will be described in a later place.

The armature 20 of the main generator MG and the armature 30 of the control generator CG are mounted on a common shaft 3, which, when in operation, is driven by the armature of a constant speed motor M1, consisting, for instance, of an alternating-current motor of the induction or squirrel-cage type.

It is also possible to obtain satisfactory operation if armature 30 is driven at constant speed while armature 20 is actuated by separate drive means which do not vary excessively, for instance, from the fly wheel of an Illigner motor generator set.

The differential field winding 33 of the control generator CG is energized by a regulator circuit A3 which is connected to the armature 40 of a regulating generator RG. This generator has a regulator field winding 41, an amplifying self-exciting winding 42, and also a biasing winding 43, all acting cumulatively on the armature 40 of the regulating generator RG. An adjusting rheostat R3 is connected between the regulating generator RG and the differential field winding 33 for varying the effective resistance value. Once adjusted, the calibration of rheostat R3 need not be changed during the operation of the control system. Field 42 may also be a shunt field.

The armature 40 of generator RG is mounted on a common shaft 5 with the armature 50 of the above-mentioned exciter EX. Shaft 5 carries also the armature of a constant speed motor M2, which may also be an alternating-current motor of the induction or squirrel-cage type. Since, when the system is in operation, both motors M1 and M2 operate at constant speed, the illustrated arrangement can be modified by using a single constant speed motor for the operation of both shafts 3 and 5, or by connecting the two shafts 3 and 5 with each other so as to obtain a single motor driven generator unit. A modification of the last-mentioned type will be described in connection with Fig. 8, and hence need not be further discussed at this place.

The field winding 41 of the regulating generator RG is excited in accordance with the current in the feed circuit A1. To this end the field winding 41 is connected through a calibrating rheostat R6 with one pole of the series connected commutating or compensating winding 22 of the main generator MG. The other terminal of winding 41 is connected with one terminal of the compensating field winding 35 whose other terminal, in turn, is connected through lead 23 with the second terminal of winding 22. Due to these connections, the series arrangement of windings 35 and 41 is traversed by a current whose magnitude varies in accordance with the voltage drop across the field winding 22, and hence is dependent on the current effective in the feed circuit A1. This action is independent of the speed of motor HM. It will be understood that an equivalent dependency on the motor current can also be obtained by a parallel connection of field windings 35 and 41, or by connecting the two windings separately with the feed circuit A1. The adjustment of rheostat R6 need not be changed during the operation of the system.

It is essential for the invention that the regulating generator RG or the appertaining circuit connections include a saturable magnetic device for producing a current-limiting control effect. This will be explained hereinafter. For the sake of convenience, however, a more complete description of the remaining electric circuit devices shown in Fig. 1 may first be given.

The exciter EX has two self-exciting fields 51 and 52. 51 is a shunt field and connected with the exciter output circuit over an adjusting rheostat R4 serving to adjust the exciter voltage to a proper magnitude. Rheostat R6 is not actuated during the control operation of the system so that the exciter output voltage remains constant. The exciter field 52 is series connected in the exciter output circuit. A single exciter field winding or a different arrangement and connection of the exciter field windings may be chosen without affecting the essential operation of the system since the only purpose of the exciter EX is to represent a convenient current source of sufficiently constant voltage.

The above-mentioned reversing switch RS has four interconnected switch contact members 101, 102, 103, and 104, respectively, cooperating with a number of stationary contacts denoted by 111', 111, 112', 112, 113, 114, 123, and 124. The members 101 and 104 are both connected to lead 54 of the exciter circuit, while contact members 102 and 103 are both attached to lead 53 of the exciter circuit.

The switch RS is placed in the illustrated position for controlling the motor HM to effect a hoisting operation and is actuated to place contact member 101 in engagement with contact 111 for causing the hoist motor HM to effect a lowering operation. When RS is in the illustrated hoisting position H, contacts 111' and 112' are engaged by contact members 101 and 102 respectively, while contact member 103 engages contact 113, and contact member 104 engages contact 114. In this position the biasing field winding 43 of the regulating generator RG is energized by exciter voltage of a suitable direction to have the biasing effect on the resultant field of windings 41 and 42 desired for the hoisting operation. In the same switch position, the lead 134 is connected through elements 113 and 103 with lead 53 of the exciter circuit. Similarly lead 135 is connected through contact 123, a connection 125, contact 114 and switch member 104 with lead 54 of the exciter circuit. The polarity of the exciter voltage now passing over the just-mentioned elements of the reversing switch RS to the leads 134 and 135 and over the control device CO to the principal field winding 31 is such as to cause the principal field winding to produce in the main generator MG a load voltage of proper sense to run the motor HM in the hoisting direction. The basic magnitude of this voltage, and hence of the motor speed, is then determined by the adjustment of slide contact 137 and can be changed by displacing the slide contact at R5.

When placing the reversing switch RS in the lowering position, switch member 101 engages the stationary contact 111, while switch member 102 engages the corresponding contact 112. In this position of the reversing switch, the biasing field winding 43 of the regulating generator RG is connected to the leads 53 and 54 of the exciter circuit and hence is energized in reversed polarity. A rheostat R5 is provided in order to calibrate the biasing effect. As a rule, the adjustment of rheostat R5 remains fixed during the normal operation of the control system. In the last-mentioned lowering position of switch RS, the switch member 103 is in engagement with stationary contact 123, while switch member 104 engages stationary contact 124. As a result, the lead 134 is connected through elements 124 and 104 with exciter lead 54, while lead 135 is connected through elements 123 and 103 with exciter lead 53. It will be seen that now the polarity of the voltage impressed by the exciter through the reversing switch RS on the principal field winding 31 of the control generator CG is opposite to that obtained when the switch RS is in hoisting position. Consequently, the motor HM is now caused to run in the lowering direction. Since the connection between the exciter circuit and the principal field winding 31 passes again over the control device CO, the magnitude of the motor speed is now also dependent on the control adjustment of the device CO.

The control device CO here illustrated as a tapped resistor is preferably designed in the form of a customary controller, and the reversing switch RS as a customary master switch. Since this preferable design of the main control elements is not essential for the invention proper, and controllers with master switches being well known as such, the simplified illustration in Fig. 1 has been chosen for the sake of convenience and clarity.

Turning now to a more detailed description of the regulating generator RG, let us recall the above-mentioned current-limiting function assigned to the regulating generator. As explained, the illustrated control system functions so as to operate the hoist motor HM in accordance with the direction and speed magnitude adjusted by the control device CO and the reversing switch RS. Suppose, however, that the slide contact 137 is displaced with such a speed in the direction to cause motor HM to accelerate that the load current in circuit A1 would exceed a safe value, thus overstressing the mechanical hoisting equipment and tending to cause excess sparking at the commutator of the motor. Then the control effect of the regulating generator RG is of such nature as to prevent these excess currents and accompanying detrimental phenomena. This limiting function is based on the fact that the excitation of the differential field winding 33 produces a field in opposition to that of the principal field winding 31. That is, the intended effect of the regulating generator RG is to reduce the resultant excitation of the control generator CG and hence the excitation of the main generator MG and thereby the current and voltage magnitudes in the feed circuit A1. Of course, this reduction is only desired when the load current in feed circuit A1 tends to exceed the safe value.

It should be noted that should the slider 137 be moved too rapidly toward the high resistance position, the inertia of the revolving mechanical parts including the armature of motor HM can prevent the hoist from slowing down rapidly, and large regenerative currents may then be passed through the feed circuit A1. The regulating generator RG is then supposed to act so as to make the field of winding 33 cumulative with that of winding 31 and thus to limit the current in A1 while the action of winding 43, as explained, renders the regenerative limit value different from that existing at non-regenerative operation.

An ideal method of obtaining the just-mentioned load limitation by the action of the regulating generator RG would be to keep the current through field winding 33 zero for all permissible values of current in the feed circuit A1 but rises sharply from zero to a relatively high value for any current in excess of the maximum permissible value. In order to have the regulating generator RG produce such a control effect, its magnetic saturation curve in the just-mentioned ideal case would be similar to that denoted by the curve $v$ in Fig. 2.

In the coordinate system of Fig. 2, the abscissa represents values of excitation effective in the regulator armature RG, while the ordinate shows the voltage values in the regulator armature circuit A3, i. e. the voltage effective across the differential field winding 33 of the control generator CG.

According to this ideal saturation curve $v$, the armature output voltage of generator RG remains zero for all values of excitation up to a maximum value which corresponds to the desired maximum value of the current in the feed circuit A1. Any excitation beyond that corresponding to the desired maximum value of current in circuit A1 causes the voltage in circuit A3 to rise steeply to a much higher value, thereby causing the differential field winding 33 to decrease the resultant field in generator CG and hence the output voltage of the main generator MG accordingly.

In order to achieve as nearly as possible the ideal saturation curve just discussed, a magnetizable magnetic circuit is associated with the energizing circuit of the regulating generator RG. More particularly, the desired magnetic saturation effect is obtained by providing the magnetic field poles of the regulating generator with a magnetic shunt path so arranged and related to the main portion of the field pole that almost all of the magnetic flux is bypassed away from the armature as long as the shunt portion is unsaturated.

A generator of this type is illustrated in Fig. 4. In this figure 201 represents the armature of the generator, and 202 the casing or frame of magnetizable material. The frame 202 carries a number of field poles, of which two are shown in the illustration. Each field pole has a main pole body 204 and 204', respectively, which is provided with a pole shoe 205 and 205' and firmly attached to the frame 202 by means of a screw bolt 206 or 206' preferably of non-magnetic material. The coils 203 or 203' of the field winding are placed on the respective pole bodies 204 and 204' so as to produce a magnetic flux through the pole bodies and pole shoes when energized. This magnetic flux passes through the armature in order to induce electric current in the armature conductors (not illustrated). A magnetic shunt path 207 consisting of an annular member is firmly clamped between each pole body and its appertaining pole shoe so as to be in good magnetic contact with both. The shunt path 207 is arranged concentrically with respect to the armature and frame. It is dimensioned so that when the coils are energized by a current of increasing magnitude, the shunt path becomes saturated before the main pole bodies reach the saturation point.

Fig. 5 shows a regulator of different construction. The regulator armature is denoted by 211, the magnetizable frame or yoke by 212 and the coils of the field winding by 213 and 213'. The coils are inductively associated with magnetic pole bodies consisting of a main pole portion 214 or 214' and a shunt portion 217 and 217', respectively. The main portion and shunt portion of each pole consist of an integral piece of magnetic material so as to form a pole shoe portion at 215 and 215', respectively. That is, the main portion and shunt portion form an integral pole surface in proximity to the periphery of the generator armature 211. Each pole is attached to the frame 212 by a screw 216 or 216'. It will be seen that the shunt portion forms a bypass and diverts part of the magnetic flux of the main portion 214 from the armature 211. In this embodiment, the magnetic shunt portions are also so rated that they become saturated at a field strength insufficient to effect saturation of the main pole portion.

According to the modification of a current limiting regulating generator shown in Fig. 6, the magnetizable frame 222 of the machine is provided with field poles composed of a central portion 224 and an integral piece of magnetic material which forms a shunt path at 227, a base section 228, and a pole shoe portion 225. The field coil 223 is arranged on the central portion 224. A gap member 229 consisting of non-magnetic material or formed by an air gap is located between the central portion 224 and the pole shoe portion 225. A screw 226 preferably of non-magnetic material serves to join the field pole with the frame 222 so as to establish magnetic contact between the contact surface formed by the base portion 228 and the corresponding surface portion of the frame 222. The shunt portion 227 is designed to be saturated at an excitation lower than that required for the saturation of the central portion 224. The pole surface formed by the pole shoe portion 225 is in proximity to the peripheral surface of the armature 221. Similar to the examples previously described, the shunt path 227 bypasses a substantial or major part of the flux of portion 224 and reduces the flux from the pole shoe surface to the armature accordingly. The bypass becomes virtually ineffective when the field strength produced by coil 223 exceeds the saturation value of the shunt path.

A short-circuited winding of a few turns, a single turn being sufficient in many cases, is provided on the shunt portion 227 for a purpose to be discussed in a later place.

Machines of the type shown in Figs. 4, 5 and 6 have a saturation curve similar to curve $v'$ in the diagram of Fig. 3, in which the abscissa and ordinate have the same meaning as in the ideal diagram of Fig. 2. According to Fig. 3, if the ampere turns of the regulator field are gradually increased, the voltage generated in the regulator output circuit (A3 in Fig. 1) will at first rise slowly because most of the magnetic flux passes through the magnetic shunt of the field poles. At a certain value of ampere turns, however, the shunt path becomes saturated so that now the flux passes through the armature of the machine, and hence causes a voltage to be generated. As a result, the rate of change of the voltage curve is changed desultorily, that is, the output voltage in the regulator armature circuit increases suddenly, relative to a gradual increase in excitation, to a value considerably higher than that previously effective. The effect of a gap such as shown at 229 in Fig. 6 is to require a greater number of ampere turns excitation before the saturation and the sudden increase of output voltage take place.

Reverting now to Fig. 1, it will be understood that the presence of a self-energizing field such as produced by the field winding 42 amplifies the above-mentioned saturation effect and causes the armature output voltage to rise as rapidly as possible immediately after the saturation of the shunt. The self-energizing field of the regulating generator should be proportioned so that the field resistance or air gap line, represented in Figs. 2 and 3 by the dash lines R and R', respectively, is almost parallel to the steepest portion of the magnetization curve. The machine will then almost, but not quite, sustain its generated voltage. It should be noted that while the presence of the just-mentioned self-energizing field, either in series or in parallel connection, will improve the operation of the regulating generator, the basic effect elucidated by Figs. 2 and 3 can also be obtained to a somewhat lesser degree without such a winding.

It will be noticed from a comparison of Figs. 2 and 3 that the actual saturation curve differs from the ideal curve in that small voltages are generated before the magnetic shunt saturates completely whereas the ideal curve maintains zero voltage in this region. The weak field winding 35 shown in Fig. 1 serves to compensate for this error. This field also compensates for IR drop in circuit A1.

The compensation functions in the following manner: When the current in circuit A1 increases, the current in the regulator field winding 41 increases correspondingly, and the regulating generator generates a small voltage which sends a small current through the differential control winding 33. The current through the regulator field winding 41 flows also through the compensating winding 35 so that the latter is, in fact, capable of balancing the effect of the undesired low excitation of control winding 33. Since the regulator field winding 41 is so proportioned that the magnetic shunt saturates when the load current of the hoist motor reaches the desired limit value, the regulating generator RG will be operating on the steep portion of the saturation curve (Fig. 3) if the load current rises above this limit value, and the current in the control field winding 33 will increase much faster than the current in the compensating winding 35. In this manner the effective corrective action is secured without interference with the current limiting operation proper of the regulating generator.

It has been mentioned that a bias field winding, such as winding 43, is advantageous in cases where a greater maximum current is permissible in one flow direction of the load current than in the other, for instance, if a greater accelerating torque is allowable in hoisting drives than a decelerating torque. The bias field of winding 43 is energized by constant voltage and reversed or changed whenever the principal field of winding 31 is reversed. This bias field winding 43 will cause a small current to be circulated through the differential control field 33. If desired, this effect can be neutralized by a weak field winding on the control generator CG connected cumulatively with respect to field winding 31, and energized by the same voltage source as the bias field winding 43 of the regulating generator.

For certain applications of a voltage control system of the type just described, the current to be limited by the current regulating generator may climb very rapidly. Due to the inductance of the regulator fields, this regulating generator may not respond instantly but will allow the current to exceed its predetermined limit value for a short period before the corrective action becomes effective. This "over-shooting" of the regulator current is elucidated by the diagram of Fig. 7.

In Fig. 7 the current in circuit A1 is plotted against the time. It will be seen that the current $c$ rises first to E, i. e. above the intended ultimate value F and then drops back to value F. Such a characteristic is undesirable. However, by giving the regulator generator an anticipatory action, it is possible to reduce or eliminate this "overshooting." The means for accomplishing this are represented in Fig. 6 by the short-circuited turn or winding on the magnetic shunt. When the current and regulator excitation rise rapidly, this turn prevents the flux from rising rapidly in the magnetic shunt path. As a result, the flux is forced through the main pole body and hence through the armature where it generates a corrective voltage before the shunt path saturates. This action is transient, and during the transient period the regulator starts to exert a corrective influence at a lower value of current than it does under steady operating conditions. When the current is reduced rapidly, the characteristics of the regulator remain practically unchanged. The magnetic shunt path which has flux trapped in it by the shorted turn loses this flux slowly. The flux path extends primarily through the main pole body as the excitation is below the value necessary to saturate the shunt and hence generates no voltage in the armature circuit. There is little or no tendency to "hang on" due to the shorted winding.

It will be noted that the last-described feature involving the short-circuited turn on the magnetic shunt path is not absolutely necessary as regards the fundamental operation of the system but is of advantage in cases where a rapid increase of regulated current is to be expected, and where this fact may lead to a disturbing effect.

The control system illustrated in Fig. 8, although differing from that of Fig. 1 in various respects, involves also the use of a current-limiting regulating generator designed in accordance with the principles set forth in the foregoing and connected to the principal control field winding of a generator, which, in turn, determines the energization of a drive motor. Numeral 1 denotes a hoisting equipment connected by a shaft 2 with the armature 10 of the drive motor HM whose field winding 11 is energized by an exciter circuit 83, 84 which includes a series connected adjusting rheostat R7 for calibrating the field of winding 11.

The motor armature 10 is series-connected with the armature 60 of a generator GN in a feed circuit A4 which includes a measuring potentiometer R9.

The generator GN has four field windings 61, 63, 64, and 65. 61 is the principal field winding and has a function similar to that of the principal field winding 31 shown in Fig. 1. 63 and 64 are differential control windings both tending to reduce the resultant field strength, while 65 is a compensating winding which acts cumulatively as regards the principal field winding 61.

The principal field winding 61 is connected through leads 94 and 95 with the stationary contacts 115, 116 and 126 of a reversing switch RS with two movable switch members 105 and 106. Switch member 105 is connected through the resistor 156 of a control device CO with lead 83 of the exciter circuit. Switch member 106 is connected with a lead of the exciter circuit 84.

The differential control winding 64 is connected to the feed circuit A4 so as to be energized in accordance with the load current. The differential control winding 63 is connected through a resistor R8 to the armature 70 of a regulating generator with two field windings 71 and 72. Winding 72 is self-energizing and hence connected with the armature output circuit A5, while winding 71 is the main regulator field winding and connected in series with winding 65 across the output terminal of the potentiometer R9. Thus, the field windings 71 and 65 are both energized in proportion to the voltage or current measured by the potentiometer R9.

The exciter EX has two self-energizing windings 81 and 82 connected with the circuit 83, 84 of the armature 80 in series and parallel connection, respectively, a rheostat R10 serving to adjust the exciter output voltage. The adjustment of R10 is not changed during the operation of the system.

The armatures 60, 70 and 80 are connected by a common drive shaft 7 with the armature 8 of a constant speed motor M3. That is, the entire control system forms a single motor generator unit.

The regulating generator RG is designed in accordance with the principle elucidated by Figs. 4, 5 and 6 and has a current limiting effect on the energizing current in the feed circuit A4 similar to the current limitation explained previously in connection with Fig. 1.

An essential difference between the systems of Figs. 1 and Fig. 8 is the fact that according to Fig. 1, the control generator acts on a main generator which, in turn, supplies the feed current proper, while according to Fig. 8, the control generator serves at the same time as the source of energization supplied to the hoist motor. It will be apparent that the simplified system according to Fig. 8 is advantageous for systems of lower energy output, as compared with that represented by Fig. 1. As to the reversal of the operating direction of the hoist motor and the control of the motor speed, the system of Fig. 8 is operated and functions similar to that of Fig. 1. In other words, when the switch RS is in the illustrated position, the motor HM of the system shown in Fig. 8 will run in one direction at a speed determined by the adjustment of the control device CO, and when the switch RS is in position to establish engagement between elements 105 and 116, and between elements 106 and 126, the motor HM will run in the opposite direction, its speed being again determined by the adjustment of the control device CO.

I claim as my invention:

1. A control system for a variable voltage drive, comprising in combination, a reversible drive motor, a feed circuit connected to said motor for supplying energizing current of controllable voltage thereto, a generator for controlling said voltage having a principal field winding and two control field windings both in differential arrangement to said principal winding, regulatable current supply means connected to said principal winding and including a reversing switch for applying to said principal winding a reversible excitation of controllable magnitude, one of said differential control windings being connected with said feed circuit for energizing said control winding in dependence upon the load current of said drive motor, a current-regulating generator having a regulator armature connected with said other differential control winding to energize the latter, said regulating generator having a regulator field winding and magnetic field poles inductively associated with said regulator field winding for controlling the energization of said other control winding, said field poles having a main pole body and a magnetic shunt path to bypass part of the magnetic flux from said main body relative to said regulator armature, said shunt path being rated relative to said main body to saturate at a lower energization of said regulator field winding, and circuit means connecting said regulator field winding with said feed circuit to energize said latter winding in dependence upon said load current whereby the rate of change of the energization supplied by said regulator armature is steeply increased due to saturation of said shunt path when said voltage of said feed circuit exceeds a given value with the result of limiting said load current.

2. A control system for a variable voltage drive, comprising in combination a reversible drive motor, a feed circuit connected to said motor for supplying energizing current of controllable voltage thereto, a generator for controlling said voltage having a principal field winding and two control field windings both in differential arrangement to said principal winding, regulatable current supply means connected to said principal winding for applying the said principal winding an excitation of controllable magnitude, one of said differential control windings being connected with said feed circuit for energizing said control winding in dependence upon the load current of said drive motor, a current-regulating generator having a regulator armature connected with said other differential control winding to energize the latter and having a regulator field winding and a self-energizing field winding associated with magnetic field poles, said self-energizing winding being connected with said regulator armature to amplify the control operation of said regulator generator, said regulator field winding being connected with said feed circuit to be energized in dependence upon said load current, said field poles having a main pole body and a magnetic shunt path to bypass part of the magnetic flux from said main body relative to said regulator armature, said shunt path being rated relative to said main body to saturate at a lower energization of said regulator field winding.

3. A control system for a variable voltage drive, comprising in combination, a reversible drive motor, a feed circuit connected to said motor for supplying load current of controllable voltage thereto, a generator for controlling said voltage having a principal field winding, a self-energizing field winding arranged to act cumulatively with said principal winding, and two control field windings both in differential arrangement to said principal winding, regulatable current supply means connected to said principal winding for supplying it with energizing current of controllable magnitude, said self-energizing winding being connected to said feed circuit so as to be excited in accordance with said load current, one of said differential control windings being connected with said feed circuit for energizing said control winding in dependence upon said load current, a current-regulating generator having a regulator armature connected with said other differential control winding to energize the latter, said regulating generator having a regulator field winding and a self-energizing field winding associated with magnetic field poles, said self-energizing winding being connected with said regulator armature to amplify the control operation of said regulator generator and said regulator field winding being connected with said feed circuit to be energized in dependence upon said load current, said field poles having a main pole body and a magnetic shunt path to bypass part of the magnetic flux from said main body relative to said regulator armature, said shunt path being rated relative to said main body to saturate at a lower energization of said regulator field winding.

4. A control system for a variable voltage drive, comprising in combination a reversible drive motor, a feed circuit connected to said motor for supplying load current of controllable voltage thereto, a generator for controlling said voltage having a principal field winding, a compensating field winding for producing a corrective field of low strength as compared with that of said principal winding, and two control field windings both in differential arrangement to said principal winding, regulatable current supply means connected to said principal winding for applying thereto excitation of controllable magnitude, one of said differential control windings being connected with said feed circuit for energizing said control winding in dependence upon said load current, a current-regulating generator having a regulator armature connected with said other differential control winding to energize the latter, said regulating generator having a regulator field winding and magnetic field poles inductively associated with said regulator field winding for controlling the energization of said other control winding, said regulator field winding and said compensating field winding being connected with each other and with said feed circuit so as to be energized in dependence upon said load current, said field poles having a main pole body and a magnetic shunt path to bypass part of the magnetic flux from said main body relative to said regulator armature, said shunt path being rated relative to said main body to saturate at a lower energization of said regulator field winding, whereby the energization of said other differential control winding is steeply increased due to saturation of said shunt path when said load current exceeds a given value.

5. An asymmetrically operating control system for a reversible variable voltage drive, comprising in combination a reversible drive motor, a feed circuit connected to said motor for supplying thereto load current of controllable voltage, a generator for controlling said voltage as to magnitude and direction having a principal field winding and two control field windings both in differential arrangement to said principal winding, regulatable current supply means connected to said principal winding and including a reversing switch for applying to said principal winding a reversible excitation of controllable magnitude, one of said differential control windings being connected with said feed circuit for energizing said control winding in dependence upon said load current, a current-regulating generator having a regulator armature connected with said other differential control winding to energize the latter, said regulating generator having a regulator field winding, a bias field winding and magnetic field poles inductively associated with said regulator field winding for controlling the energization of said other control winding, said regulator field winding being connected with said feed circuit so as to be energized in dependence upon said load current, said magnetic field poles having a main pole and a magnetic bypass in shunt arrangement relative to said regulator armature, said bypass being rated for saturation at a lower energization of said regulator field winding than said main pole, whereby the energization of said other differential control winding is steeply increased due to saturation of said bypass when said load current exceeds a given value, and current supply means connected with said bias winding and controlled by said reversing switch for differently energizing said bias winding in different reversing positions of said switch so as to obtain the desired asymmetry of control of said drive motor.

6. An asymmetrically operating control system for a reversible variable voltage drive, comprising in combination a reversible drive motor, a feed circuit connected to said motor for supplying it with load current of controllable voltage, a generator for controlling said voltage as to magnitude and direction having a principal field winding, a compensating field winding for producing a corrective field of low strength as compared with that of said principal winding, and to control field windings both in differential arrangement to said principal winding, regulatable current supply means connected to said principal winding for providing it with controllable excitation, one of said differential control windings being connected with said feed circuit for energizing said control winding in dependence upon said load current, a current-regulating generator having a regulator armature connected with said other differential control winding to energize the latter, said regulating generator having a regulator field winding, a bias field winding, an amplifying field winding and magnetic field poles for controlling the energization of said other control winding, said regulator field winding being connected with said feed circuit so as to be energized in dependence upon said load current, said magnetic field poles being inductively associated with said regulator field winding and having a main pole and a magnetic shunt path rated for saturation at a lower energization of said regulator field winding than said main pole whereby the energization of said other differential control winding is steeply increased due to saturation of said shunt path when said load current exceeds a given value, said amplifying field winding being connected to said regulator armature so as to be excited in accordance with the energization of said other control winding, means for energizing said regulator field winding and said compensating field in dependence upon said load current, and current supply means connected with said bias winding and controlled by said reversing switch for differently energizing said bias winding in different reversing positions of said switch so as to obtain the desired asymmetry of control of said drive motor.

7. A current control system comprising in combination a generator having an armature circuit for providing the current to be controlled, said generator having a principal winding and two control field windings in differential arrangement relative to said principal winding, regulatable current supply means connected to said principal winding to apply thereto a controllable excitation circuit means connected with one of said differential control windings for energizing the latter in dependence upon said current, a current-regulating generator having an armature connected with said other differential winding to supply energization to the latter and a regulator field winding for controlling said energization, circuit means connected between said armature circuit and said regulator field winding for energizing the latter in dependence upon said current, and saturable magnetic means associated with said regulator field winding for effecting a sudden increase in rate of change of the energization of said regulator field winding when said current exceeds a given value.

8. A current control system comprising in combination a generator having an armature circuit for providing the current to be controlled, said generator having a principal winding and two control field windings in differential arrangement relative to said principal winding, regulatable current supply means connected to said principal winding to apply thereto a controllable energization, circuit means connected with one of said differential control windings for energizing the latter in dependence upon said current and current-regulating circuit means connected with said other differential winding to energize the latter in dependence upon said current, said circuit means including saturable magnetic means for increasing the rate of change of the energization of said latter winding when said current exceeds a given value.

9. A current control system comprising in combination a generator having an armature circuit for providing the current to be controlled, said generator having a principal winding and a control winding arranged to act differentially relative to each other, regulatable current supply means connected to said principal winding to apply thereto a controllable energization, and current regulating circuit means connected with said differential control winding to energize the latter in dependence upon said current, said circuit means including saturable magnetic means for increasing the rate of change of the energization of said latter winding when said current exceeds a given value.

10. A current control system comprising in combination a generator having an armature circuit for providing the current to be controlled, said generator having a principal winding and a control winding arranged to act differentially relative to each other, regulatable current supply means connected to said principal winding to apply thereto a controllable energization, a current-regulating generator having an armature connected to said differential control winding to energize the latter and a regulator field winding for controlling said latter armature, current-responsive circuit means connected with said regulator field winding for energizing said latter winding in dependence upon said current, and saturable magnetic means associated with said regulator field winding for effecting a sudden increase in the rate of change of energization of said regulator field winding when said current exceeds a given value.

11. A current control system comprising in combination a main generator having a main armature circuit for providing the current to be controlled and a field winding for controlling said main armature circuit, a control generator having an armature connected to said main generator field winding to energize the latter, said control generator having a principal control field winding and two control field windings both in differential connection relative to said principal control field winding, a current source of substantially constant voltage connected to said principal field winding, adjustable current control means interposed between said source and said principal control field winding to adjust the energization of said latter winding, one of said two differential control field windings being connected to said main armature circuit so as to be energized in accordance with said current, a current-regulating generator having an armature connected with said remaining differential control field winding to energize the latter and a regulator field winding connected to said main armature circuit to be energized in dependence upon said current, and saturable magnetic means associated with said regulator field winding for suddenly increasing the rate of change of the energization of said regulator field winding when said current exceeds a given magnitude.

12. An asymmetrically operating control system for a reversible variable voltage drive, comprising in combination a reversible drive motor having a motor armature and a motor field winding, a feed circuit connected to said motor armature for energizing it by load current of controllable voltage, a generator having a generator armature for controlling said voltage as to magnitude and polarity, a principal field winding and two control field windings both in differential arrangement to said principal winding, regulatable current supply means connected to said principal winding and including a reversing switch for applying to said principal winding a reversible excitation of controllable magnitude, one of said differential control windings being connected with said feed circuit for energizing said control winding in dependence upon said load current, a current regulating generator having a regulator armature connected with said other differential control winding to energize the latter, said regulating generator having a regulator field winding, an amplifying field winding, a bias field winding and magnetic field poles for controlling the energization of said other control winding, said regulator field winding being connected with said feed circuit so as to be energized in dependence upon the energization of said drive motor, said magnetic field poles being inductively associated with said regulator field winding and having a main pole and a magnetic bypass in shunt arrangement relative to said regulator armature, said bypass being rated for saturation at a lower energization of said regulator field winding than said main pole whereby the energization of said other differential control winding is steeply increased due to saturation of said bypass when said voltage of said feed circuit exceeds a given value, said amplifying field winding being connected to said regulator armature so as to be excited in accordance with the energization of said other control winding, current supply means connected with said bias winding and controlled by said reversing switch for differently energizing said bias winding in different reversing positions of said switch so as to obtain the desired asymmetry of control of said drive motor, means for driving said two armatures at constant speed, and a current source of constant voltage connected to said motor field winding to provide separate excitation of said latter winding.

13. An electric motor control system comprising in combination, a motor to be controlled, a generator having an armature circuit connected with said motor for supplying it with controllable load current, said generator having a principal field winding and a control winding arranged to act differentially relative to each other, regulatable current supply means connected to said principal winding to apply thereto a controllable energization, and current regulating circuit means connected with said differential control winding to energize the latter in dependence upon said load current, said circuit means including saturable magnetic means for increasing the rate of change of the energization of said latter winding when said load current exceeds a given value.

14. An electric motor control system comprising in combination, a motor to be controlled, a generator having an armature circuit connected with said motor for supplying it with load current of variable voltage, said generator having a principal field winding for controlling said voltage and a control winding arranged to act differentially relative to said principal winding, regulatable current supply means connected to said principal winding to apply thereto a controllable energization, a current regulating generator having an armature connected to said differential control winding to apply excitation to the latter and a regulator field winding for controlling said excitation, current-responsive circuit means connected with said regulator field winding for energizing said latter winding in dependence upon said load current, and saturable magnetic means associated with said regulator field winding for effecting a sudden increase in the rate of change of the energization of said regulator field winding when said load current exceeds a given value.

15. An electric motor control system comprising in combination, a motor to be controlled, a main generator having a main armature circuit connected with said motor to supply it with load current of controllable voltage and a field winding for controlling said voltage, a control generator having an armature connected to said main generator field winding to energize the latter, said control generator having a principal control field winding and two control field windings both in differential connection relative to said principal control field winding, a current source of substantially constant voltage connected to said principal field winding, adjustable current control means interposed between said source and said principal winding to vary its energization in order to effect a basic control of said voltage, one of said two differential control field windings being connected to said main armature circuit so as to be energized in dependence upon said load current, a current regulating generator having an armature connected with said other differential control field windings to energize the latter, said regulating generator having a regulator field winding connected to said main armature circuit to be energized in dependence upon the energization of said motor and saturable magnetic means associated with said regulator field winding for suddenly increasing the rate of change of the energization of said regulator field winding when said load current exceeds a given value.

16. An electric motor control system comprising in combination, a motor to be controlled, a main generator having a field winding and a main armature circuit connected with said motor to energize it by load current of controllable voltage, a control generator having an armature connected to said main generator field winding to energize the latter and including a principal control field winding and two control field windings both in differential connection relative to said principal control field winding, a current source of substantially constant voltage connected to said principal field winding, adjustable current control means interposed between said source and said principal winding for varying the energization of the latter so as to effect a basic voltage control of said motor, one of said two differential control field windings being connected to said main armature circuit so as to be energized in dependence upon said load current, a current regulating generator comprising an armature connected with said other differential control field windings to energize the latter and having a regulator field winding associated with magnetic field poles and connected to said main armature circuit to be energized in dependence upon said load current, said poles having a main pole body and a magnetic path disposed in shunt arrangement relative to said main body so as to bypass part of the magnetic flow of said main pole body relative to said armature of said regulating generator, said shunt path being dimensioned relative to said main pole body to saturate before said body at increasing energization of said associated field winding, whereby the rate of change of the energization supplied by said regulator armature to said connected control field winding is steeply increased due to saturation of said shunt path when said load current exceeds a given value.

17. A current control system comprising, in combination, a generator having an armature circuit for providing the current to be controlled and including a principal winding and a control winding arranged to act differentially relative to each other, regulatable current supply means connected to said principal winding to apply thereto a controllable energization, a current regulating generator having an armature connected with said differential control winding to energize the latter and including a regulator field winding and magnetic field poles, said regulator field winding being connected to said generator armature circuit so as to be energized in dependence upon said current, said field poles having a main pole body and a magnetic path disposed in shunt arrangement relative to said main body so as to bypass part of the magnetic flux of said main pole body relative to said armature of said regulating generator, said shunt path being dimensioned relative to said main pole body to saturate before said body at increasing energization of said regulator field winding, whereby the rate of change of the energization supplied by said regulator armature to said control field winding is steeply increased due to saturation of said shunt path when said current exceeds a given value.

18. A current control system comprising, in combination, a generator having an armature circuit for providing the current to be controlled, said generator having a principal winding and two control field windings both in differential connection relative to said principal winding, regulatable current supply means connected to said principal winding to apply thereto a controllable energization, circuit means connected with one of said differential control windings for energizing the latter in dependence upon said current, a current regulating generator having an armature connected with said other differential winding to energize the latter and including magnetic field poles and a regulator field winding associated with said poles and connected to said generator armature circuit so as to be energized in dependence upon said current, said field poles having a main pole body and a magnetic path disposed in shunt arrangement to said main body and dimensioned to saturate before said body at increasing energization of said regulator field winding, whereby the rate of change of the energization supplied by said regulator armature to said connected control field winding is steeply increased due to saturation of said shunt path when said current exceeds a given value.

19. A current control system comprising, in combination, a main generator having a main armature circuit for providing the current to be controlled and a field winding for controlling said main armature circuit, a control generator having an armature connected to said main generator field winding to energize the latter and including a principal control field winding and two control field windings both in differential connection relative to said principal control field winding, a current source of substantially constant voltage connected to said principal field winding, adjustable current control means interposed between said source and said principal control field winding to vary the energization of said latter winding, one of said two differential control field windings being connected to said main armature circuit so as to be energized in accordance with said current, a current regulating generator having an armature connected with said remaining differential control field winding to energize the latter and including magnetic field poles and associated with said poles and connected to said main armature circuit so as to be energized in dependence upon said current, said field poles having a main pole body and a magnetic shunt path dimensioned to saturate before said main body at increasing energization of said regulator field winding, whereby the energization supplied by said regulator armature to said latter control field winding is steeply increased due to saturation of said shunt path when said current exceeds a given value.

20. A system for controlling a variable voltage drive, comprising, in combination, a reversible and separately excited drive motor, a main generator having an armature connected to said motor for supplying it with load current of controllable voltage, said generator having a main field winding for controlling said voltage, a control generator having a control armature connected with said main field winding to energize the latter and containing a principal field winding, and two control field windings both in differential arrangement to said principal winding, regulatable current supply means connected to said principal winding and including a reversing switch for applying to said principal winding a reversible excitation of controllable magnitude, one of said differential control windings being connected with said main generator armature for energizing said control winding in dependence upon said load current, a current regulating generator having a regulator armature connected with said other differential control winding to energize the latter, and comprising a regulator field winding and magnetic field poles inductively associated with said regulator field winding for controlling the energization of said other control winding, said field poles having a main pole body and a magnetic path disposed in shunt arrangement relative to said main body to bypass part of the magnetic flux from said main body relative to said regulator armature, said shunt path being rated relative to said main body to saturate at a lower energization of said regulator field winding, and circuit means connecting said regulator field winding with said main generator armature to energize said regulator field winding in dependence upon said load current, whereby the energization of said other control winding by said regulator armature is suddenly increased due to saturation of said shunt path when said voltage exceeds a given magnitude.

21. A system for controlling a variable voltage drive, comprising, in combination, a reversible separately excited drive motor, a main generator having an armature connected to said motor for supplying it with load current of controllable voltage, said generator having a main field winding for controlling said voltage, a control generator having a control armature connected with said main field winding to energize the latter and containing a principal field winding, an amplifying field winding, a compensating field winding for producing a corrective field of low strength as compared with that of said principal winding, and two control field windings both in differential arrangement to said principal winding, regulatable current supply means connected to said principal winding for applying thereto an energizing current of controllable magnitude, circuit means connected with one of said differential control windings for energizing it in dependence upon said voltage, a current regulating generator having a regulator armature connected with said other control winding to energize the latter and containing a regulator field winding, an amplifying field winding and magnetic field poles associated with said two latter field windings for controlling the energization of said other control winding, said amplifying field winding being connected with said regulator armature to be excited in accordance with the energization of said other control winding, said field poles having a main pole body and a magnetic shunt rated for saturation at a lower energization of said regulator field winding than said main body, circuit means exciting said regulator field winding and said compensating field winding in dependence upon said load current, and means for driving said three generators at substantially constant speed.

22. An asymmetrically operating control system comprising, in combination, a reversible drive motor of voltage-responsive speed and torque characteristics, said motor having a motor armature and a field winding, a constant voltage source connected to said motor field winding to provide separate excitation, a feed circuit connected to said motor armature, a main generator having a field winding and including an armature arranged in said feed circuit to provide said motor with load current, a control generator having a control armature connected with said main generator field winding to energize the latter and comprising a principal field winding, an amplifying field winding, a compensating field winding for producing a connective field of low strength as compared with the field strength of said principal field winding and two control field windings both in differential arrangement to said principal winding, regulatable current supply means connected to said principal winding and including a reversing switch for applying to said principal winding a reversible energizing current of controllable magnitude, said amplifying field winding being connected with said control armature so as to be excited in accordance with the energization of said main generator field winding, one of said differential control windings being connected with said feed circuit for energizing said control winding in dependence upon said load current, a current regulating generator having a regulator armature connected with said other differential control winding to energize the latter and including a regulator field winding, a self-exciting field winding, a bias field winding and magnetic field poles inductively associated with said regulator field winding, said regulator field winding and said compensating field winding being connected to said feed circuit so as to be energized in dependence upon said load current, said self-exciting field winding being connected with said regulator armature so as to be excited in accordance with the energization of said other control winding, current supply means connected with said bias winding and controlled by said reversing switch for differently energizing said bias winding in different reversing positions of said switch so as to obtain the desired asymmetry of control of said drive motor, and said field poles having a main pole body and a magnetic shunt rated relative to said main body to saturate at a lower energization of said regulator field winding.

23. A system for controlling a variable voltage drive comprising, in combination, a drive motor, a feed circuit connected to said drive motor, a generator having an armature arranged in said circuit to supply load current of controllable voltage to said motor and comprising a principal winding for controlling said voltage and a control winding disposed to act differentially relative to said principal winding, regulatable energizing means connected to said principal winding, a current regulating generator having an armature connected with said differential control winding to energize the latter and including magnetic field poles and a regulator field winding associated with said poles and connected with said feed circuit so as to be energized in dependence upon said load current, said poles having a main pole body and a magnetic path disposed in shunt arrangement relative to said main body so as to bypass part of the magnetic flux of said main pole body relative to said armature of said regulating generator, said shunt path being dimensioned relative to said main pole body to saturate before said body at increasing energization of said regulator field winding, and a short-circuited winding arranged on said magnetic shunt path, whereby the energizing current supplied by said regulator armature to said control winding is steeply increased due to the effect of said shunt path and short-circuited winding when said load current exceeds a given value.

24. A variable voltage drive comprising a drive motor, a main generator having an armature circuit connected to said motor and a main generator field winding for controlling the voltage of said circuit, a control generator having a self-excited voltage-sustaining field winding and a current limiting field winding and further field winding means, operator-controlled circuit means for providing an adjustable pattern voltage and circuit means for providing a control voltage variable in accordance with the speed of said motor, said circuit means being both connected with said field winding means so as to cause them to produce in said control generator a field excitation in accordance with the differential effect of said pattern voltage and control voltage, a regulating generator with saturably shunted field poles for generating abruptly increasing output voltage in dependence upon the passing of its field excitation through a shunt-saturating value, said regulating generator being connected with said current limiting field winding so as to impress said output voltage thereon for reducing the resultant field excitation of said control generator accordingly, and circuit means for supplying field excitation to said regulating generator in dependence upon the load current of said motor.

JOE G. IVY.